(12) United States Patent
Foucaut et al.

(10) Patent No.: US 11,852,055 B2
(45) Date of Patent: Dec. 26, 2023

(54) ACTUATOR WITH OPEN-LOOP CONTROL DIRECT DRIVE

(71) Applicant: MMT AG, Zug (CH)

(72) Inventors: Antoine Foucaut, Montarlot lès Rioz (FR); Pierre Gemberlé, Biel/Bienn (CH); Antoine Bourgade, Biel/Bienne (CH)

(73) Assignee: MMT AG, Zug (CH)

( * ) Notice: Subject to any disclaimer, the term of this patent is extended or adjusted under 35 U.S.C. 154(b) by 317 days.

(21) Appl. No.: 16/955,559

(22) PCT Filed: Dec. 21, 2018

(86) PCT No.: PCT/EP2018/086501
§ 371 (c)(1),
(2) Date: Jun. 18, 2020

(87) PCT Pub. No.: WO2019/122299
PCT Pub. Date: Jun. 27, 2019

(65) Prior Publication Data
US 2020/0318505 A1    Oct. 8, 2020

(30) Foreign Application Priority Data

Dec. 21, 2017  (FR) ..................................... 1762829

(51) Int. Cl.
*F01L 9/22*      (2021.01)
*F01L 1/047*     (2006.01)
*H02K 7/075*     (2006.01)
*H02K 7/12*      (2006.01)
(Continued)

(52) U.S. Cl.
CPC ................. *F01L 9/22* (2021.01); *F01L 1/047* (2013.01); *F01L 9/20* (2021.01); *H02K 7/075* (2013.01); *H02K 7/12* (2013.01); *F01L 2009/213* (2021.01); *F01L 2009/2107* (2021.01); *F01L 2009/2169* (2021.01); *F01L 2009/25* (2021.01);
(Continued)

(58) Field of Classification Search
CPC ....... H02K 35/00–06; H02K 33/00–18; H02K 1/34; F16K 31/04
USPC .................... 251/129.12, 129.11; 310/36–39
See application file for complete search history.

(56) References Cited

U.S. PATENT DOCUMENTS 8,222,777 B2   7/2012   Loussert et al.
8,502,426 B2   8/2013   Loussert et al.
(Continued)

FOREIGN PATENT DOCUMENTS

EP    0359653 A1 *   3/1990   ............. F16H 55/48
EP    03596563    *   3/1990
(Continued)

*Primary Examiner* — Wesley G Harris
(74) *Attorney, Agent, or Firm* — Harness, Dickey & Pierce PLC

(57) ABSTRACT

Travel of a brushless rotary actuator is limited by two stops, including a wound stator and a magnetic cylindrical rotor rigidly attached to a shaft having a first end rigidly attached to a control member. A second end of the shaft is rigidly attached to a travel limiting part acting as stops, and the travel limiting part has bending, resilient beam shapes. The actuator is electrically controlled in an open-loop. A control system controls a lift value of valves of an internal combustion engine by a lever driven by such an actuator.

18 Claims, 3 Drawing Sheets

(51) Int. Cl.
   *F01L 9/20* (2021.01)
   *F01L 9/21* (2021.01)
(52) U.S. Cl.
   CPC ... *F01L 2820/032* (2013.01); *F01L 2820/041* (2013.01)

(56) References Cited

U.S. PATENT DOCUMENTS

| | | | |
|---|---|---|---|
| 2003/0227362 A1* | 12/2003 | Byram | H02K 3/522 |
| | | | 335/220 |
| 2006/0181171 A1 | 8/2006 | Zhao | |
| 2008/0197728 A1 | 8/2008 | Loussert et al. | |
| 2009/0014085 A1 | 1/2009 | Faller | |
| 2012/0019185 A1* | 1/2012 | Guidarelli | G03B 15/00 |
| | | | 318/561 |
| 2012/0326574 A1 | 12/2012 | Lousset et al. | |
| 2017/0133907 A1 | 5/2017 | Choi et al. | |

FOREIGN PATENT DOCUMENTS

| | | | | |
|---|---|---|---|---|
| EP | 1122868 A2 | | 8/2001 | |
| FR | 2732417 | * | 10/1996 | |
| FR | 2732417 A1 | * | 10/1996 | ............ F16B 37/122 |
| WO | WO 2012023159 | * | 2/2012 | |
| WO | WO-2012023159 A1 | * | 2/2012 | ............. H02K 26/00 |
| WO | WO-2013164272 A1 | * | 11/2013 | ................ F01L 1/34 |

* cited by examiner

ACTUATOR WITH OPEN-LOOP CONTROL DIRECT DRIVE

CROSS-REFERENCE TO RELATED APPLICATIONS

This application is a National Phase Entry of International Patent Application No. PCT/EP2018/086501, filed on Dec. 21, 2018, which claims priority to French Patent Application Serial No. 17/62829, filed on Dec. 21, 2017, both of which are incorporated by reference herein.

TECHNICAL FIELD

The present invention concerns the field of electric actuators with direct drive moving a control member along a limited angular travel. Such actuators can, for example, be used to drive movement of a camshaft of an internal combustion engine.

BACKGROUND

Patent EP1897211 discloses a single-phase electromagnetic servo actuator composed of a rotary actuator designed to move a mobile member along a limited travel, including a 2N pole stator structure, N being equal to 1 or 2, and at least one field coil, said stator structure being made of a material with high magnetic permeability, and a rotor having a ferromagnetic yoke and a thin magnetized portion consisting of 2N pairs of axially magnetized poles, in alternate directions and a rotor angular position sensor. These servo actuators are generally used in closed-loop, i.e. with continuous control of movement thanks to the feedback provided by the position sensor, in order to guarantee precise positioning.

The disadvantage of this solution of the prior art is that a strong impact is produced when the movement of the rotor is stopped by solid stops. Impact can create rebounding and therefore erratic positioning, at least temporarily, when the stops are too stiff, and can also cause breakage of these stops due to repeated impact. For this reason, the solutions of the prior art often use position sensors and closed-loop control (with position sensor for continuous feedback and continuous movement correction) to slow movement at the end of movement to protect the stops. This solution nevertheless complicates the product and represents a significant cost.

SUMMARY

The object of the present invention is to remedy this cited disadvantage by proposing an actuator controlled in an open-loop (i.e. a control without continuous feedback from a position sensor), limiting impact at the end of travel while ensuring high reliability, robustness and a longer service life. To this end, the invention concerns, in its most general sense, a brushless rotary actuator with travel limited by two stops, comprising a wound stator and a magnetic cylindrical rotor rigidly attached to a shaft having a first end rigidly attached to a control member, characterized in that the second end of said shaft is rigidly attached to a travel limiting part acting as stops, in that said travel limiting part has bending, resilient beam shapes, and in that the actuator is electrically controlled in an open-loop.

Preferably, said control member also has a bending, resilient beam shape. Advantageously, said beams are made of a material with a ratio between the breaking stress and the modulus of elasticity greater than 0.020 and a Charpy notched impact strength greater than 20 kJ/m2. This combination of beam and materials with mechanical characteristics favorable to viscoelastic damping ensures a long service life of the device in open-loop control in which the position or speed are not continuously controlled in order to minimize the impact speed when moving from one end of actuator travel to the other.

The material selected for the travel limiting part and the control member is preferably, but not limited to, an unfilled thermoplastic material and said beams are symmetrical to allow identical damping from one end of travel to the other. Likewise, the actuator can accept a mechanical movement return spring in a predefined position in open-loop control, for example when the control voltage is stopped. Specifically, the travel limiting part preferably has:

- at least two engaging pads with said rotor, engaging longitudinally in complementary housings provided on the surface of the yoke of said rotor,
- at least two travel limiting pads, extending axially on the opposite side of said engaging pads of the rotor, and movable between two travel limiting stops,
- a means for anchoring a spiral end of a spring, the opposite end of said spring being rigidly attached to the housing of said actuator,
- a centering element of said part with respect to the rotor shaft,
- elastically deformable zones connecting an engaging pad to the consecutive travel limiting pad.

According to variants which are not mutually exclusive:
- each of said engaging pads with the rotor extends perpendicular to a radial arm,
- each of said travel limiting pads extends perpendicular to a radial arm, in a direction opposite to the direction of said engaging pads,
- each of said travel limiting pads extends perpendicular to an elastically deformable radial arm,
- said elastically deformable radial arm consists of a bracket split by a radial slot,
- said radial arms extend to an intermediate annular zone, and are connected by radially extending hairpin bridges,
- said radial arms and said hairpin bridges extend in a first transverse plane, offset with respect to a second plane corresponding to said centering element formed of arms connecting an annular central zone for the passage of the rotor shaft, the opposite end of said arms being connected to the junction point between a radial arm and one of said bridges,
- the actuator comprises an annular magnet surrounding the interior zone between said shaft and said junction points between a radial arm and one of said bridges,
- the front end of the rotor shaft is rigidly attached to a coupling fork,
- the front end of the rotor shaft has a knurled configuration for receiving a brass ring, a thermoplastic part being overmolded onto said ring to form the control member.

The actuator alternately comprises a position sensor designed to provide feedback on the position of the rotor in order to determine the state of actuation. It is typically a digital sensor providing on/off feedback to determine whether the actuation has been carried out, i.e. whether the rotor has moved along its travel.

The application of this actuator is typically, but not limited to, the driving, via the control member, of a lever rigidly attached to a camshaft of a motorized vehicle. As such, the invention also concerns a control system for controlling the lift value of the valves of an internal combustion engine comprising a camshaft, characterized in that the movement of said camshaft is ensured by a lever driven by a brushless rotary actuator with travel limited by two stops, comprising a wound stator and a magnetic cylindrical rotor rigidly attached to a shaft having a first end rigidly attached to a control member, wherein the second end of said shaft is rigidly attached to a travel limiting part acting as stops, in that said travel limiting part has bending, resilient beam shapes, said actuator being electrically controlled in an open-loop.

BRIEF DESCRIPTION OF THE DRAWINGS

The present invention will be better understood upon reading the detailed description of a non-limiting embodiment of the invention which follows, referring to the accompanying drawings in which.

DETAILED DESCRIPTION

Figure 1:
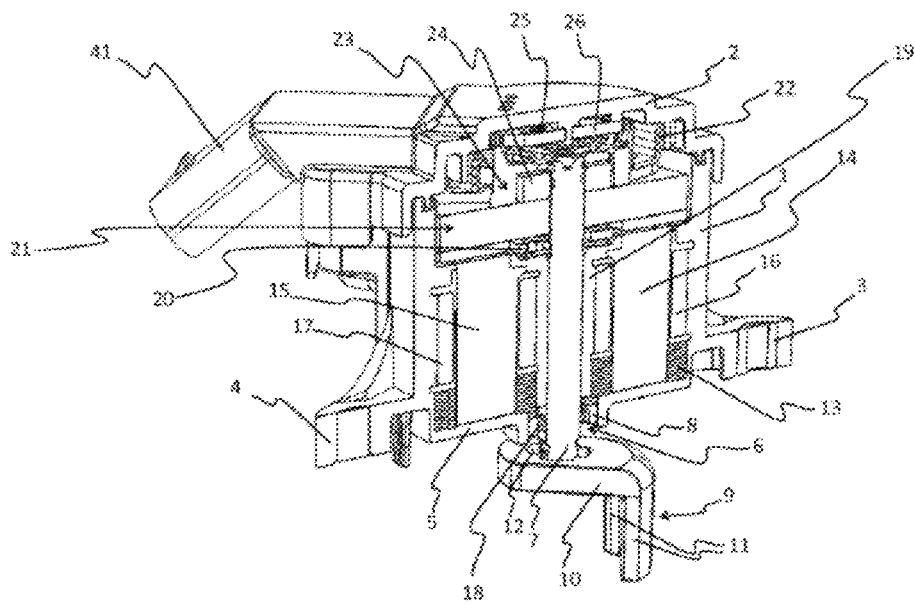
FIG. 1 is a sectional view along a longitudinal plane of an actuator according to the invention.
Figure 2:
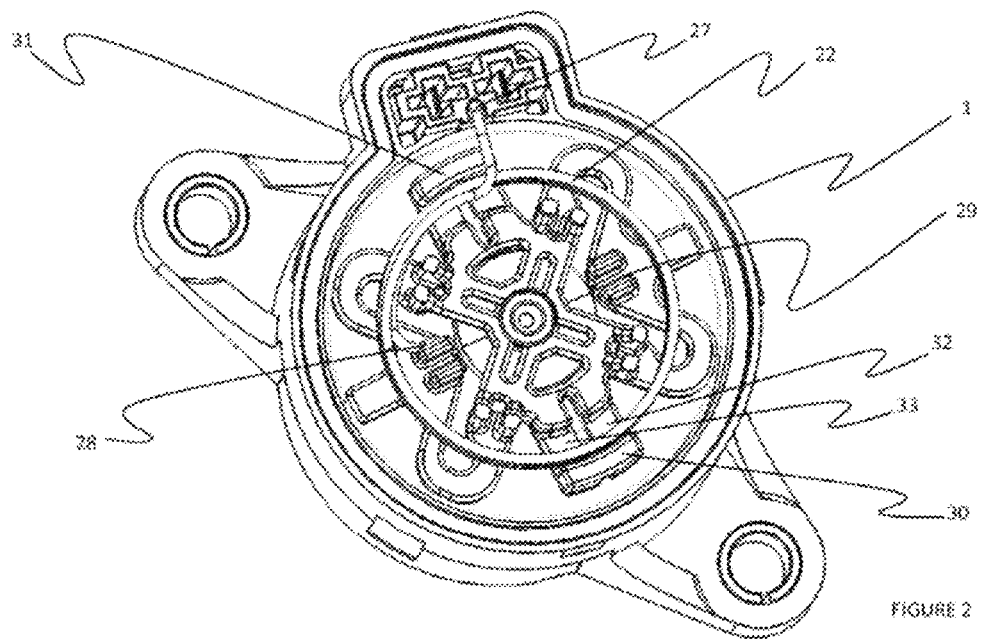
FIG. 2 is a top view of the actuator, without its cover.
Figure 3:
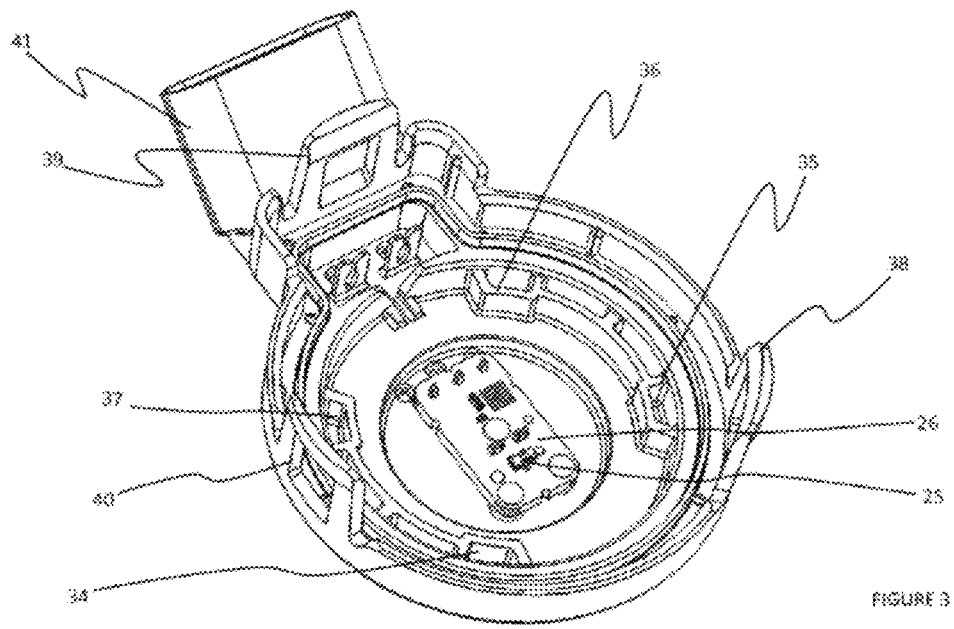
FIG. 3 is a bottom view of the actuator cover.

FIGS. 1 to 3 illustrate the general structure of the actuator. The latter consists of a generally cylindrical housing (1), closed at the rear end by a cover (2). The housing (1) has fixing lugs (3, 4) at its front part. It is closed at its front part by a front end (5) crossed by a central passage (6) for the passage of a shaft (7). The shaft (7) is guided by a bearing (8) inserted into the passage (6). A lip seal (18) seals the passage (6).

Figure 5:
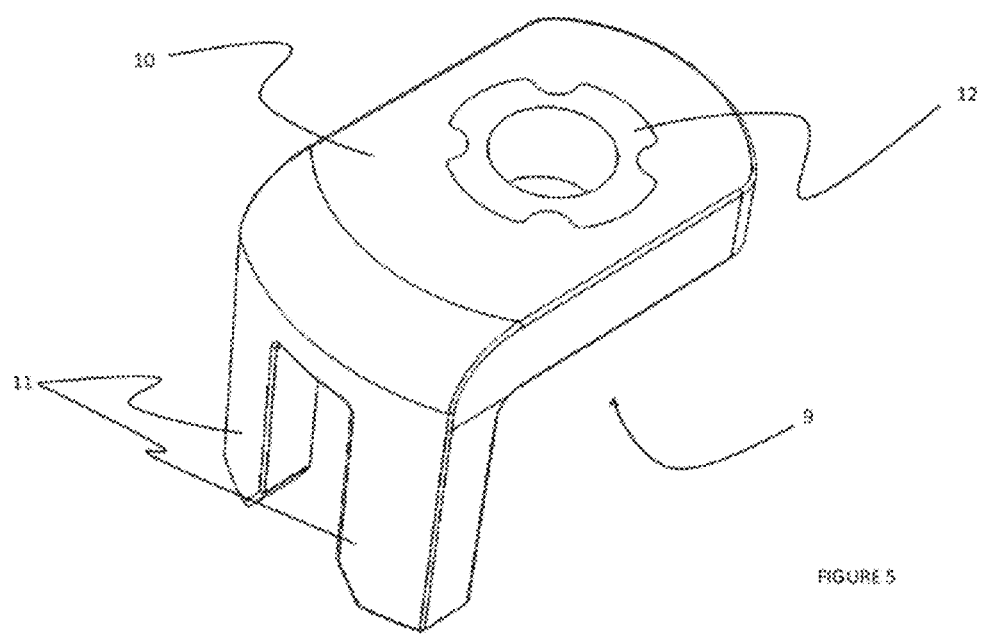
FIG. 5 is a detailed view of the actuator.

This shaft (7) drives, at its first end, a control member (9), the details of which are shown in FIG. 5, having an arm (10) extending radially, extended by a fork (11) extending in a plane perpendicular to the arm (10). The arm (10) is connected to the shaft (7) by a metal ring (12) overmolded into the arm (10) and cooperating with a knurled end of the shaft (7). The arm (10) and the fork shape (11) preferably have a mechanical beam function which contributes to damping the movement when the rotor of the actuator reaches an end of travel in an on/off operation. The material used for this control member will be selected in order to optimize the mechanical strength as well as this damping function, and will be, for example, an unfilled thermoplastic material. For example, the material used is TW341 with a tensile elasticity modulus of 1000 MPa, a breaking stress of 55 MPA, and a Charpy notched impact strength of 35 kJ/m2.

The actuator comprises, in a known manner, a stator formed by a base plate (13) comprising a plate stack of ferromagnetic sheets in which the pole pieces (14, 15) are driven in the form of cylinder portions, each surrounded by a coil (16, 17) of electric wires. In the center of the stator, the actuator has a tube (19) in the central position, which surrounds the shaft (7) and supports at its rear end an axial ball bearing (20) supporting the rotor (21) having, in a known manner, a ferromagnetic yoke carrying permanent magnets used for actuation in combination with the action of the coils (16, 17). This assembly causes the angular displacement of the rotor (21) in a first direction when the wound stator is supplied with electric current. A spring (22) ensures the angular displacement (the return) of the rotor (21) in an opposite angular direction, until it returns to an original position.

A travel limiting part (23) rigidly attached to the rotor (21), and positioned at the second end of the shaft (7), limits its movement between a rest position controlled by the spring (22), and a working position controlled by the current supply of the stator. An annular permanent magnet (24) rigidly attached to the rotor (21) provides a magnetic field detected by a magnetosensitive probe (25) positioned in the extension of the shaft (7). This magnetosensitive probe (25) is mounted on a printed circuit board (26) fixed on the cover (2). It is specified that the position sensor formed by the annular magnet (24) and the magnetosensitive probe (25) is used in order to roughly determine the position of the rotor (for example, to know whether or not the rotor has performed the movement) but that it is not used for closed-loop control of the actuator.

FIG. 2 shows in more detail that one end of the spring (22) is fixed in a notch (27) provided on the housing (1). The other end (28) is engaged in a fork (29) extending over the travel limiting part (23). The travel limiting part (23) has travel limiting pads (30, 31) with arcuate sections, extending perpendicular to the forked radial brackets respectively (32, 33). The spring (22) is housed inside the casing defined by the inner surface of said travel limiting pads (23, 24). The travel limiting pads (30, 31) move between two fixed stops (34, 35; 36, 37) formed inside the cover.

In FIG. 3, a connector (41) extends radially with respect to the cover (2). Clips (38, 39, 40) ensure that the cover (2) is fixed to the housing (1) without tools.

Detailed Description of the Travel Limiting Part

Figure 4:
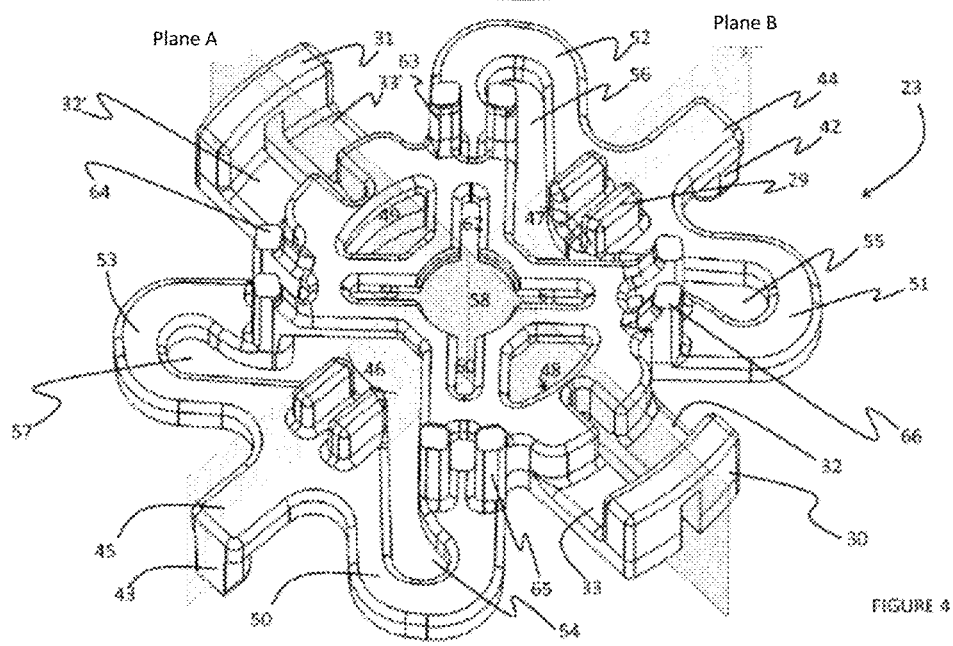
FIG. 4 is a perspective view of the travel limiting part.

The travel limiting part (23) consists of an injected plastic part as can be observed in FIG. 4. It has a first symmetry with respect to a median longitudinal plane A passing through the two travel limiting pads (30, 31), and a second symmetry with respect to a median longitudinal plane B passing through the two engaging pads (42, 43) with the rotor (21). These two engaging pads (42, 43) extend perpendicular to the arms (44, 45) respectively and engage in a complementary cavity provided on the rear surface of the rotor (21).

These arms (44, 45) do not join the center of the part (23) but extend from an end corresponding to the radius of the rotor (21) to an intermediate radius (46, 47). Similarly, the arms (32, 33) do not join the center of the part (23) but extend from an end corresponding to the radius of the rotor (21) to an intermediate radius (48, 49). The rear end of an arm (44, 45) supporting the engaging pad (42, 43) is connected to the rear end of an adjacent arm (32, 33) supporting the travel limiting pad (30, 31) by a bridge (50, 51, 52, 53) in the form of a pin (50 to 53).

These bridges (50, 51, 52, 53) extend radially and define a curved end extended by two arms separated by a radial slot (54 to 57). This slot (54 to 57) widens slightly on the side of the angularly closest limiting pad. These bridges (50, 51, 52, 53) forming bending, mechanical beams, thus offer viscoelastic deformation making it possible to absorb the impact and dissipate its energy when the travel limiting pads (30, 31) come into contact with the stop (34, 35 or 36, 37). Preferably, by the combination of the damping properties accumulated between this travel limiting part (23) and the control member (9), the viability and the service life of the actuator in the application are considerably increased.

Inside this part (23) is a configuration having a central passage (58) defined by four split arms (59 to 62) connected to the junction region between a bridge (50, 51, 52, 53) and an arm (32, 33, 44, 45). This configuration is in a plane offset axially with respect to the plane defined by the bridges (50, 51, 52, 53) and the arms (32, 33, 44, 45). To allow optimal adjustment of the spring preload, the stop limiting part has several forks (29, 63 to 66). The movable end of the spring can be engaged in any one of these forks (29, 63 to 66).

The invention claimed is:

1. A brushless rotary actuator comprising:
   two stops;
   a wound stator;
   a magnetic cylindrical rotor;
   a shaft rigidly attached to the rotor, the shaft having a first end and a second end;
   a control member rigidly attached to the first end of the shaft, wherein the control member has a resilient beam configured to damp movement when the rotor reaches an end of travel position; and
   a travel limiter rigidly attached to the second end of the shaft, wherein the travel limiter has one or more resilient beams configured to elastically bend when the travel limiter comes into contact with the two stops;
   wherein the actuator is configured to be electrically controlled in an open-loop.

2. The brushless rotary actuator according to clean 1, wherein the one or more resilient beams of the travel limiter and the control member are made of a material with a ratio between a breaking stress and a modulus of elasticity greater than 0.020 and a Charpy notched impact strength greater than 20 kJ/m².

3. The brushless rotary actuator according to claim 2, wherein one or both of the travel limiter and the control member comprise an unfilled thermoplastic material.

4. The brushless rotary actuator according to claim 1, wherein the one or more resilient beams of the travel limiter are symmetrical to allow identical damping from one end of travel to the other.

5. The brushless rotary actuator according to claim 1, further comprising a mechanical spring configured to return the rotor to a predefined position.

6. The brushless rotary actuator according to a claim 1, wherein the travel limiter includes:
   at least two engaging pads configured to engage with the rotor;
   at least two travel limiting pads movable between the two stops;
   an anchor configured to receive a spiral end of a spring; and
   a centering element of the travel limiter with respect to the shaft;
   wherein at least one of the one or more resilient beams of the travel limiter connect an engaging pad of the at least two engaging pads to a travel limiting pad of the at least two travel limiting pads.

7. The brushless rotary actuator according to claim 6, wherein each of the at least two engaging pads extends perpendicular to a radial arm.

8. The brushless rotary actuator according to claim 7, wherein the radial arm extends to an intermediate annular zone, and is connected by radially extending hairpin bridges.

9. The brushless rotary actuator according to claim 8, wherein the radial arm and the hairpin bridges extend in a first transverse plane, offset with respect to a second plane corresponding to the centering element formed of arms connecting an annular central zone for passage of the shaft, the arms being connected to a junction point between the radial arm and one of the hairpin bridges.

10. The brushless rotary actuator according to claim 9, further comprising an annular magnet in an interior zone between the shaft and the junction point between the radial arm and one of the hairpin bridges.

11. The brushless rotary actuator according to claim 6, wherein each of the at least two travel limiting pads extends perpendicular to a radial arm, in a direction opposite to a direction of the at least two engaging pads.

12. The brushless rotary actuator according to claim 11, wherein each of the at least two travel limiting pads extends perpendicular to an elastically deformable radial arm.

13. The brushless rotary actuator according to claim 12, wherein the elastically deformable radial arm comprises a bracket split by a radial slot.

14. The brushless rotary actuator according to claim 1, wherein the control member is in a form of a coupling fork.

15. The brushless rotary actuator according to claim 1, wherein the first end of the shaft has a knurled configuration for receiving a ring, and a thermoplastic part being overmolded onto the ring to form the control member.

16. The brushless rotary actuator according to claim 1, further comprising a position sensor designed to provide feedback on a position of the rotor in order to determine a state of actuation.

17. A brushless rotary actuator comprising:
   an actuator housing;
   a cover configured to cooperate with the actuator, the cover comprising a stop;
   a shaft having a first end and a second end;
   a stator surrounding at least a portion of the shaft;
   a rotor attached to the shaft proximate to the second end of the shaft; and
   a travel limiter proximate to the rotor, the travel limiter comprising:
      a central portion;
      a first arm extending radially away from the central portion;
      a first engaging pad extending in a first axial direction perpendicularly from an end of the first arm;
      a second arm extending radially away from the central portion in a direction opposite the first arm;
      a second engaging pad extending in the first axial direction perpendicularly from an end of the second arm;
      a first pair of curved bridges extending from the central portion, the first pair of curved bridges connecting the first arm to the central portion;
      a second pair of curved bridges extending from the central portion, the first pair of curved bridges connecting the second arm to the central portion;
      a third arm extending radially away from the central portion;
      a first travel limiting pad extending in a second axial direction perpendicularly from an end of the third arm, the second axial direction opposite the first axial direction;
      a fourth arm extending radially away from the central portion; and
      a second travel limiting pad extending in the second axial direction perpendicularly from an end of the fourth arm;
   wherein the first engaging pad and the second engaging pad are configured to engage with the rotor; and
   wherein the first pair of curved bridges and the second pair of curved bridges are configured to elastically deform when one or more of the first travel limiting pad and the second travel limiting pad contact the stop of the cover.

18. The rotary actuator of claim 17, further comprising a return spring configured to engage with the travel limiter.

* * * * *